US011465208B2

(12) United States Patent
Okada et al.

(10) Patent No.: US 11,465,208 B2
(45) Date of Patent: Oct. 11, 2022

(54) METHOD OF MANUFACTURING COPPER NANO-INK AND COPPER NANO-INK

(71) Applicant: SUMITOMO ELECTRIC INDUSTRIES, LTD., Osaka (JP)

(72) Inventors: Issei Okada, Osaka (JP); Motohiko Sugiura, Osaka (JP); Hiroki Kakudo, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 322 days.

(21) Appl. No.: 16/766,870

(22) PCT Filed: Oct. 4, 2018

(86) PCT No.: PCT/JP2018/037222
§ 371 (c)(1),
(2) Date: May 26, 2020

(87) PCT Pub. No.: WO2019/135306
PCT Pub. Date: Jul. 11, 2019

(65) Prior Publication Data
US 2021/0291271 A1 Sep. 23, 2021

(30) Foreign Application Priority Data
Jan. 5, 2018 (JP) .............................. JP2018-000859

(51) Int. Cl.
B22F 9/24 (2006.01)
C09D 11/52 (2014.01)
B82Y 40/00 (2011.01)

(52) U.S. Cl.
CPC ................ B22F 9/24 (2013.01); C09D 11/52 (2013.01); B82Y 40/00 (2013.01)

(58) Field of Classification Search
CPC ........................................................ B22F 9/24
See application file for complete search history.

(56) References Cited

U.S. PATENT DOCUMENTS

| 4,059,451 A | * | 11/1977 | Oita | ........................ | C23C 18/40 |
| | | | | | 427/437 |
| 2012/0170241 A1 | * | 7/2012 | Nakako | .................. | C09D 11/52 |
| | | | | | 977/773 |

(Continued)

FOREIGN PATENT DOCUMENTS

| CN | 102549086 | 7/2012 |
| JP | 2007-197756 | 8/2007 |

(Continued)

OTHER PUBLICATIONS

Akiyama, Y. et al., Contribution of Ligand Oxidation Products to High Durability of Copper Films Prepared from Low-Sintering-Temperature Copper Ink on Polymer Substrates, Advanced Engineering Materials, May 10, 2017, vol. 19, No. 8, DOI:10.1002/adem.201700259, ISSN: 1527-2648.

Primary Examiner — William D Young
(74) Attorney, Agent, or Firm — IPUSA, PLLC

(57) ABSTRACT

A method of manufacturing a copper nano-ink includes: a step of preparing a copper nanoparticle aqueous dispersion liquid including copper nanoparticles and anions; and a step of storing the copper nanoparticle aqueous dispersion liquid at 5° C. or less after the step of preparing, wherein in the step of storing, a copper ion concentration of the copper nanoparticle aqueous dispersion liquid is controlled to be greater than or equal to 0.1 g/L and less than or equal to 1.0 g/L and an anion concentration is controlled to be greater than or equal to 0.5 g/L and less than or equal to 8.0 g/L.

1 Claim, 1 Drawing Sheet

(56) References Cited

U.S. PATENT DOCUMENTS

| | | |
|---|---|---|
| 2017/0073538 A1 | 3/2017 | Kawasaki et al. |
| 2017/0274453 A1* | 9/2017 | Okada .................... C09D 5/24 |
| 2018/0079000 A1* | 3/2018 | Okada .................... C23C 18/54 |
| 2018/0111190 A1* | 4/2018 | Okada .................. B22F 1/0007 |

FOREIGN PATENT DOCUMENTS

| | | |
|---|---|---|
| JP | 2010-189681 | 9/2010 |
| JP | 2015-180769 | 10/2015 |
| JP | 2016-152405 | 8/2016 |
| JP | 2018-127712 | 8/2018 |
| WO | 2015/129466 | 9/2015 |

* cited by examiner

METHOD OF MANUFACTURING COPPER NANO-INK AND COPPER NANO-INK

TECHNICAL FIELD

The present invention relates to a method of manufacturing a copper nano-ink and a copper nano-ink. The present application is based on and claims priority to Japanese Patent Application No. 2018-000859, filed on Jan. 5, 2018, the entire contents of the Japanese Patent Application are hereby incorporated herein by reference.

BACKGROUND ART

In recent years, copper nano-inks in which copper nanoparticles are dispersed in a solvent such as water are used to form metal layers or the like of printed wiring boards.

A metal layer as described above includes a sintered body of copper nanoparticles and is formed by sintering a coating formed on the surface of a base film by applying a copper nano-ink (see Japanese Laid-open Patent Publication No. 2016-152405).

PRIOR ART DOCUMENT

Patent Document

[Patent Document 1] Japanese Laid-open Patent Publication No. 2016-152405

SUMMARY OF THE INVENTION

According to one aspect of the present disclosure, a method of manufacturing a copper nano-ink includes: a step of preparing a copper nanoparticle aqueous dispersion liquid including copper nanoparticles and anions; and a step of storing the copper nanoparticle aqueous dispersion liquid at 5° C. or less after the step of preparing, wherein in the step of storing, a copper ion concentration of the copper nanoparticle aqueous dispersion liquid is controlled to be greater than or equal to 0.1 g/L and less than or equal to 1.0 g/L and an anion concentration is controlled to be greater than or equal to 0.5 g/L and less than or equal to 8.0 g/L.

A copper nano-ink according to another aspect of the present disclosure is a copper nano-ink in which copper nanoparticles and anions are dispersed in water, wherein a copper ion concentration is greater than or equal to 0.1 g/L and less than or equal to 1.0 g/L and an anion concentration is greater than or equal to 0.5 g/L and less than or equal to 8.0 g/L, and wherein $1.0 \times 10^{-2} \times T \leq R \leq 9.0 \times 10^{-2} \times T$ where a rate of change of the copper ion concentration is R [%/h] and a storage temperature of the copper nano-ink is T [° C.].

EMBODIMENT FOR CARRYING OUT THE INVENTION

Figure 1:
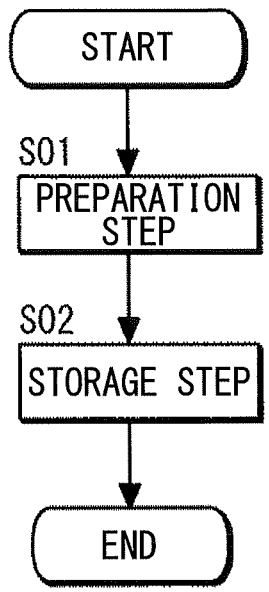
FIG. 1 is a flowchart illustrating a method of manufacturing a copper nano-ink according to one embodiment of the present disclosure.

Problems to Be Solved by the Present Disclosure

Copper nanoparticles contained in a conventional copper nano-ink are easily oxidized by contact with air or dissolved oxygen in the ink. Also, copper nanoparticles change to copper ions by oxidation. Therefore, the copper ion concentration of the copper nano-ink becomes high, and the dispersibility of copper nanoparticles in the ink is deteriorated. As a result, when the copper nano-ink is applied to the surface of a base film, it is difficult to uniformly disperse the copper nanoparticles on the base film surface, and it is difficult to form a sufficiently dense metal layer.

In view of the above, the present disclosure has an object to provide a method of manufacturing a copper nano-ink that can enhance the dispersibility of copper nanoparticles and to provide a copper nano-ink in which the dispersibility of copper nanoparticles is high.

Effect of the Present Disclosure

The method of manufacturing a copper nano-ink according to the present disclosure can enhance the dispersibility of copper nanoparticles. Also, in a copper nano-ink according to the present disclosure, the dispersibility of copper nanoparticles is high.

Problem to Be Solved by the Present Disclosure

To begin with, aspects of the present disclosure are listed and described below.

According to one aspect of the present disclosure, a method of manufacturing a copper nano-ink includes: a step of preparing a copper nanoparticle aqueous dispersion liquid including copper nanoparticles and anions; and a step of storing the copper nanoparticle aqueous dispersion liquid at 5° C. or less after the step of preparing, wherein in the step of storing, a copper ion concentration of the copper nanoparticle aqueous dispersion liquid is controlled to be greater than or equal to 0.1 g/L and less than or equal to 1.0 g/L and an anion concentration is controlled to be greater than or equal to 0.5 g/L and less than or equal to 8.0 g/L.

According to the method of manufacturing a copper nano-ink, by preparing the copper nanoparticle aqueous dispersion liquid containing copper nanoparticles and anions in the step of preparing and by controlling, in the step of storing, the copper ion concentration and the anion concentration of the copper nanoparticle aqueous dispersion liquid in the above described ranges, the dispersibility of the copper nanoparticles in the obtained copper nano-ink can be enhanced.

It is preferable that the anions are chloride ions. In this way, by the anions being chloride ions, the copper ion concentration of the copper nanoparticle aqueous dispersion liquid can be easily and reliably controlled within the above described range in the step of storing.

It is preferable that control is performed such that $50 \leq C \times D \leq 150$ where the anion concentration is C [g/L] and an average particle size of the copper nanoparticles is D [nm] in the step of preparing. In this way, by controlling the value of $C \times D$ within the above described range in the step of preparing, the copper ion concentration of the copper nanoparticle aqueous dispersion liquid can be easily and reliably controlled within the above described range in the step of storing.

It is preferable that the step of storing is performed immediately after the step of preparing. In this way, by performing the step of storing immediately after the step of preparing, the copper ion concentration of the obtained copper nano-ink can be kept sufficiently low.

A copper nano-ink according to one aspect of the present disclosure is a copper nano-ink in which copper nanoparticles and anions are dispersed in water, wherein a copper ion concentration is greater than or equal to 0.1 g/L and less than or equal to 1.0 g/L and an anion concentration is greater than or equal to 0.5 g/L and less than or equal to 8.0 g/L, and wherein $1.0 \times 10^{-2} \times T \leq R \leq 9.0 \times 10^{-2} \times T$ where a rate of change of the copper ion concentration is R [%/h] and a storage temperature of the copper nano-ink is T [° C.].

Because the copper nano-ink can keep the copper ion concentration low, the dispersibility of the copper nanoparticles is high.

It should be noted that in the present disclosure, the "average particle size" of copper nanoparticles refers to a median diameter that is calculated from a volume-based cumulative distribution measured by a laser diffraction method. The "rate of change of copper ion concentration [%/h]" in the copper nano-ink refers to a value that is obtained by dividing a rate [%] of increase of the copper ion concentration of the copper nano-ink, where the copper ion concentration immediately after storage is calculated as 100%, by a storage time [h] of the copper nano-ink.

Details of Embodiment of the Present Disclosure

In the following, a method of manufacturing a copper nano-ink and a copper nano-ink according to an embodiment of the present disclosure will be described with reference to the drawings.

[Method of Manufacturing Copper Nano-Ink]

As illustrated in FIG. 1, the method of manufacturing a copper nano-ink includes: a step (S01) of preparing a copper nanoparticle aqueous dispersion liquid including copper nanoparticles and anions (in the following, referred to as the "preparation step"); and a step (S02) of storing the copper nanoparticle aqueous dispersion liquid at 5° C. or less after the step (S01) of preparing (in the following, referred to as the "storage step"). In the method of manufacturing a copper nano-ink, in the step (S02) of storing, a copper ion concentration of the copper nanoparticle aqueous dispersion liquid is controlled to be greater than or equal to 0.1 g/L and less than or equal to 1.0 g/L and an anion concentration is controlled to be greater than or equal to 0.5 g/L and less than or equal to 8.0 g/L. It should be noted that the "copper nanoparticles" refers to copper particles having particle sizes of 1 nm or more and less than 1 μm.

According to the method of manufacturing a copper nano-ink, by preparing the copper nanoparticle aqueous dispersion liquid containing copper nanoparticles and anions in the preparation step (S01) and by controlling, in the storage step (S02), the copper ion concentration and the anion concentration of the copper nanoparticle aqueous dispersion liquid in the above described ranges, the copper ion concentration of the obtained copper nano-ink can be kept low. More specifically, according to the method of manufacturing a nano-ink, in the storage step (S02), by controlling the anion concentration of the copper nanoparticle aqueous dispersion liquid within the above described range and by managing the copper nanoparticle aqueous dispersion liquid at 5° C. or less, an increase in the copper ion concentration of the copper nanoparticle aqueous dispersion liquid can be suppressed. Thus, the copper ion concentration of the copper nanoparticle aqueous dispersion liquid can be controlled in the above described range in the storage step (S02). As a result, the method of manufacturing a copper nano-ink can keep the copper ion concentration of the obtained copper nano-ink low. Therefore, the method of manufacturing a copper nano-ink can enhance the dispersibility of the copper nanoparticles in the copper nano-ink.

The reason why the dispersibility of the copper nanoparticles can be enhanced by keeping the copper ion concentration of the copper nano-ink low is considered to be because, by keeping the copper ion concentration of copper nano-ink low, a decrease in the electric potential on the surfaces of the copper nanoparticles is suppressed and electrostatic repulsion between the copper nanoparticles is easily obtained.

(Preparation Step)

Figure 2:
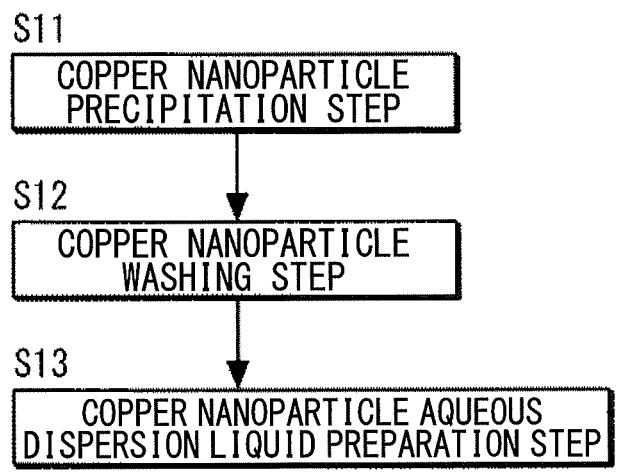
FIG. 2 is a flowchart illustrating details of a step of preparing in the method of manufacturing a copper nano-ink of FIG. 1.

As illustrated in FIG. 2, the preparation step (S01) includes a copper nanoparticle precipitation step (S11), a copper nanoparticle washing step (S12), and a copper nanoparticle aqueous dispersion liquid preparation step (S13).

<Copper Nanoparticle Precipitation Step>

S11 is performed by, for example, a liquid phase reduction method. In this liquid phase reduction method, copper ions are reduced by a reducing agent in a solution containing a complexing agent and a dispersant to precipitate copper nanoparticles in the solution.

In S11, for example, a water-soluble copper compound to be an origin of copper ions that form copper nanoparticles, a dispersant, and a complexing agent are dissolved in water, and a reducing agent is added to reduce copper ions for a period of time. The copper nanoparticles manufactured by this liquid phase reduction method are uniformly spherical or granular in shape. Also, the copper nanoparticles manufactured by this liquid phase reduction method can be fine particles with an average particle size of 50 nm or less, for example. As the water-soluble copper compound to be the origin of the copper ions, for example, copper(II) nitrate trihydrate ($Cu(NO_3)_2 \cdot 3H_2O$), copper (II) sulfate pentahydrate ($CuSO_4 \cdot 5H_2O$), or the like can be used.

As the reducing agent, various reducing agents capable of reducing and precipitating copper ions in the reaction system of a liquid phase (aqueous solution) can be used. Examples of the reducing agent include sodium borohydride, sodium hypophosphite, hydrazine, transition metal ions such as trivalent titanium ions and divalent cobalt ions, ascorbic acid, reducing sugars such as glucose and fructose, polyhydric alcohols such as ethylene glycol and glycerol, and the like. Among them, trivalent titanium ions are preferable as a reducing agent. It should be noted that the liquid phase reduction method using trivalent titanium ions as a reducing agent is referred to as a titanium redox method. In the titanium redox method, copper ions are reduced by the oxidation-reduction effect when trivalent titanium ions are oxidized to tetravalent titanium ions such that copper nanoparticles are precipitated. By this titanium redox method, copper nanoparticles that are fine and having uniform particle sizes are easily formed.

It is preferable that the dispersant does not contain sulfur, phosphorus, boron, halogens, and alkalis in terms of preventing the degradation of components. Preferable examples of the dispersant include nitrogen-containing polymeric dispersants such as polyethyleneimine and polyvinylpyrrolidone; hydrocarbon-based polymeric dispersants having a carboxylic acid group in its molecule, such as polyacrylic acid and carboxymethyl cellulose; polymeric dispersants having a polar group, such as Poval (polyvinyl alcohol), styrene-maleic acid copolymers, olefin-maleic acid copolymers, and copolymers having a polyethyleneimine moiety and a polyethylene oxide moiety in one molecule thereof.

As the complexing agent, one or more of sodium citrate, sodium tartrate, sodium acetate, gluconic acid, sodium thiosulfate, ammonia, ethylenediaminetetraacetic acid, and the like can be used. Among them, sodium citrate is preferable as the complexing agent.

To adjust the particle sizes of the copper particles, the types and the mixing ratio of the metal compound, the dispersant, and the reducing agent may be adjusted, and the stirring rate, the temperature, the time, the pH, and the like in when subjecting the copper compound to a reduction reaction may be adjusted. The lower limit of the pH of the reaction system is preferably 7, and the upper limit of the pH of the reaction system is preferably 13. By setting the pH of the reaction system within the above range, copper nanoparticles having minute particle sizes can be obtained. At this time, by using a pH adjuster, it is possible to easily adjust the pH of the reaction system in the range described above. Examples of the pH adjuster that can be used include common acids and alkalis, such as hydrochloric acid, sulfuric acid, nitric acid, sodium hydroxide, sodium carbonate, and ammonia. In particular, to prevent the degradation of peripheral members, nitric acid and sodium carbonate, which does not contain impurity elements such as alkali metals, alkaline-earth metals, halogen elements, sulfur, phosphorus, and boron, are preferable.

For example, the content percentage of copper nanoparticles in the copper nanoparticle dispersion liquid is preferably greater than or equal to 0.1% by mass and less than or equal to 5.0% by mass.

The lower limit of the average particle size of the copper nanoparticles in the copper nanoparticle dispersion liquid is preferably 5 nm and is more preferably 10 nm. On the other hand, the upper limit of the average particle size is preferably 200 nm, is more preferably 100 nm, and is further more preferably 50 nm. Because the specific surface area increases as the particle size of copper nanoparticles decreases, in the method of manufacturing a copper nano-ink, as the particle size of the copper nanoparticles decreases, the anion concentration that is required to prevent oxidation of the copper nanoparticles increases. On the other hand, when the anion concentration is excessively high, in a case in which a metal layer is formed using a copper nano-ink obtained by the method of manufacturing the copper nano-ink, anions tend to remain in the metal layer, which may adversely affect a subsequent etching step. In this regard, when the average particle size is smaller than the lower limit, the required anion concentration may be high and subsequent etching may not be easy. Conversely, when the average particle size exceeds the upper limit, it may be difficult to form a sufficiently dense metal layer.

It is preferable that particle sizes of the copper nanoparticles in the copper nanoparticle dispersion liquid are relatively uniform. For example, the upper limit of the coefficient of variation of the particle size distribution of the copper nanoparticles is preferably 45%, and is more preferably 35%. When the coefficient of variation exceeds the above upper limit, it may not be easy to properly adjust the anion concentration that is required to prevent oxidation of the copper nanoparticles.

In S11, anions are added to manufacture a copper nanoparticle dispersion liquid. In the method of manufacturing a copper nano-ink, anions are added in S11 to manufacture the copper nanoparticle dispersion liquid, and after washing the copper nanoparticles in S12, the anion concentration of the copper nanoparticle aqueous dispersion liquid can be appropriately adjusted by mixing the copper nanoparticles and water while adjusting the concentration of the copper nanoparticles in S13. In S11, an ionic compound containing anions may be added to manufacture the copper nanoparticle dispersion liquid, and a molecular compound that dissociates into anions in the copper nanoparticle dispersion liquid may be added. Also, the anions may be derived from an additive such as a reducing agent or a pH adjuster that is added in a step of performing the liquid phase reduction method. Examples of the anions include chloride ions, sulfate ions, nitrate ions, carbonate ions, and the like.

<Copper Nanoparticle Washing Step>

In S12, the copper nanoparticles precipitated in S11 are washed. In S12, the amount of anions attached to the surfaces of the copper nanoparticles is adjusted.

S12 includes, for example, a centrifugation step of centrifuging the copper nanoparticle dispersion liquid obtained in S11 and a water washing step of washing, with water, a copper nanoparticle concentrate containing copper nanoparticles separated from a liquid phase in the centrifugation step. In S12, the centrifugation step and the water washing step may be performed only once each, or the centrifugation step and the water washing step may be repeated multiple times alternately.

The lower limit of the centrifugal acceleration in the centrifugation step is preferably 10000 G and is more preferably 20000 G. On the other hand, the upper limit of the centrifugal acceleration is preferably 100000 G and is more preferably 70000 G. The copper nanoparticles may not be sufficiently centrifuged when the centrifugal acceleration is less than the lower limit. Conversely, when the centrifugal acceleration exceeds the upper limit, the concentration of the copper nanoparticle concentrate after centrifugation may be too high, causing the copper nanoparticle concentrate to adhere to a container or the like and the yield rate to decrease. On the other hand, when the centrifugal acceleration is within the above described range, the copper nanoparticles can be appropriately washed while adjusting the amount of anions attached on the surfaces of the copper nanoparticles.

<Copper Nanoparticle Aqueous Dispersion Liquid Preparation Step>

In S13, the copper nanoparticle aqueous dispersion liquid is prepared by adding water, preferably pure water, to the copper nanoparticles washed in S12. In S13, the copper ion concentration and the anion concentration in the copper nanoparticle aqueous dispersion liquid are adjusted by adjusting the concentration of the copper nanoparticles. It should be noted that in S13, together with the water, an organic solvent may be added by a predetermined ratio as needed.

As described above, the copper nanoparticle aqueous dispersion liquid prepared in S13 contains the anions added in S11. Examples of the anions contained in the copper nanoparticle aqueous dispersion liquid include chloride ions, sulfate ions, nitrate ions, carbonate ions, and the like, among which chloride ions are preferable. By the anions being chloride ions, the copper ion concentration of the copper nanoparticle aqueous dispersion liquid can be easily and reliably controlled in an appropriate range in the storage step (S02).

The average particle size and the coefficient of variation of the particle size distribution of the copper nanoparticles contained in the copper nanoparticle aqueous dispersion liquid prepared in S13 can be similar to the average particle size and the coefficient of variation of the particle size distribution of the copper nanoparticles precipitated in S11.

The lower limit of the concentration of the copper nanoparticles in the copper nanoparticle aqueous dispersion liquid prepared in S13 is preferably 10% by mass and is more preferably 20% by mass. On the other hand, the upper limit of the concentration of the copper nanoparticles is preferably 50% by mass and is more preferably 40% by mass. When the concentration of the copper nanoparticles is less than the lower limit, the copper ion concentration and the anion concentration of the copper nanoparticle aqueous dispersion liquid may be insufficient. Conversely, when the concentration of the copper nanoparticles exceeds the upper limit, the copper ion concentration and the anion concentration of the copper nanoparticle aqueous dispersion liquid may be excessively high.

The lower limit of the anion concentration of the copper nanoparticle aqueous dispersion liquid prepared in S13 is preferably 0.5 g/L and is more preferably 1.0 g/L. On the other hand, the upper limit of the anion concentration is preferably 8.0 g/L, is more preferably 6.5 g/L, and is further more preferably 5.0 g/L. The anion concentration of the copper nanoparticle aqueous dispersion liquid does not normally change substantially in the storage step (S02) described later below. Therefore, when the anion concentration is less than the lower limit, the dispersibility of the copper nanoparticles may be insufficient due to the insufficiency of the anion concentration in the storage step (S02). Conversely, when the anion concentration exceeds the upper limit, in a case in which a metal layer is formed using a copper nano-ink obtained by the method of manufacturing the copper nano-ink, anions tend to remain in the metal layer, which may adversely affect a subsequent etching step.

In S13, it is preferable that control is performed such that $50 \leq C \times D \leq 150$ where the anion concentration is C [g/L] and the average particle size of the copper nanoparticles is D [nm] of the copper nanoparticle aqueous dispersion liquid. Also, the lower limit of $C \times D$ is more preferably 60 and is further more preferably 70. On the other hand, the upper limit of $C \times D$ is more preferably 100 and is further more preferably 80. Because the specific surface area increases as the particle size of copper nanoparticles decreases, in the method of manufacturing a copper nano-ink, as the particle size of the copper nanoparticles decreases, the anion concentration that is required to prevent oxidation of the copper nanoparticles increases. In this regard, by controlling the particle sizes of the copper nanoparticles and the anion concentration within the range described above, the copper ion concentration of the copper nanoparticle aqueous dispersion liquid can be easily and reliably controlled within an appropriate range in the storage step (S02).

(Storage Step)

In S02, the copper nanoparticle aqueous dispersion liquid prepared in S01 is stored. In the method of a manufacturing copper nano-ink, the copper ion concentration of the copper nanoparticle aqueous dispersion liquid tends to increase immediately after preparation of the copper nanoparticle aqueous dispersion liquid. Therefore, in order to appropriately control the copper ion concentration of the copper nanoparticle aqueous dispersion liquid, it is preferable that S02 is performed immediately after S01. That is, in the method of manufacturing a copper nano-ink, it is preferable to store, at S02, the copper nanoparticle aqueous dispersion liquid prepared in S01 from immediately after S01 to a time of using the copper nanoparticle aqueous dispersion liquid. Thereby, it is possible to keep the copper ion concentration in the obtained copper nano-ink sufficiently low. The upper limit of the interval between the preparation of the copper nanoparticle water dispersion by S01 and the start of S02 is preferably 5 hours, is more preferably 2 hours, and is further more preferably 1 hour. When the interval exceeds the upper limit, the copper ion concentration of the copper nanoparticle aqueous dispersion liquid may become excessively high between S01 and S02.

It should be noted that the shorter the interval, the better, and the lower limit may be 0 hours. It should be noted that in the method of manufacturing a copper nano-ink, the copper nanoparticle aqueous dispersion liquid stored in S02 is called the "copper nano-ink"

In S02, the copper ion concentration of the copper nanoparticle aqueous dispersion liquid prepared in S01 is controlled to be greater than or equal to 0.1 g/L and less than or equal to 1.0 g/L, and the anion concentration is controlled to be 0.5 g/L or more and 8.0 g/L or less.

As described above, the copper ion concentration of the copper nanoparticle aqueous dispersion liquid prepared in S01 tends to increase immediately after preparation of the copper nanoparticle aqueous dispersion liquid. Therefore, in S02, in order to suppress the increase in the copper ion concentration of the copper nanoparticle aqueous dispersion liquid, the anion concentration of the copper nanoparticle aqueous dispersion liquid is controlled within the range described above. As described above, in S02, the anion concentration of the copper nanoparticle aqueous dispersion liquid does not change substantially. Therefore, the anion concentration in the copper nanoparticle aqueous dispersion liquid in S02 is approximately equal to the anion concentration in the copper nanoparticle aqueous dispersion liquid prepared in S13. The lower limit of the anion concentration in the copper nanoparticle aqueous dispersion liquid in S02 is preferably 1.0 g/L. On the other hand, the upper limit of the anion concentration is preferably 6.5 g/L and is more preferably 5.0 g/L. When the anion concentration is less than the lower limit, the copper ion concentration of the copper nanoparticle aqueous dispersion liquid tends to increase, and the dispersibility of the copper nanoparticles may decrease. Conversely, when the anion concentration exceeds the upper limit, in a case in which a metal layer is formed using a copper nano-ink obtained by the method of manufacturing the copper nano-ink, anions tend to remain in the metal layer, which may adversely affect a subsequent etching step.

Also, in S02, the storage environment of the copper nanoparticle aqueous dispersion liquid prepared in S01 is controlled to be less than or equal to 5° C. Also, the upper limit of the storage temperature of the copper nanoparticle aqueous dispersion liquid in S02 is preferably 3° C. and is more preferably 2° C. In S02, the copper nanoparticle aqueous dispersion liquid prepared in S01 is stored in a storage container such as a refrigerator for control. By controlling the storage environment of the copper nanoparticle aqueous dispersion liquid to be less than or equal to 5° C., an increase in the copper ion concentration of the copper nanoparticle aqueous dispersion liquid can be suppressed.

The storage period of the copper nanoparticle aqueous dispersion liquid at S02 is not particularly limited. Note that the storage period of the copper nanoparticle aqueous dispersion liquid at S02 may be, for example, longer than or equal to 20 days, longer than or equal to 30 days, or longer than or equal to 100 days. According to the method of manufacturing a copper nano-ink, even when the storage period at S02 is within the range described above, it is possible to manufacture a copper nano-ink with high dispersibility of copper nanoparticles.

[Copper Nano-Ink]

The copper nano-ink is a copper nano-ink in which copper nanoparticles and anions are dispersed in water, wherein a copper ion concentration is greater than or equal to 0.1 g/L and less than or equal to 1.0 g/L and an anion concentration is greater than or equal to 0.5 g/L and less than or equal to 8.0 g/L, and wherein $1.0 \times 10^{-2} \times T \leq R \leq 9.0 \times 10^{-2} \times T$ where a rate of change of the copper ion concentration is R [%/h] and a storage temperature of the copper nano-ink is T [° C.]. The copper nano-ink may be composed of, for example, the copper nanoparticle aqueous dispersion liquid prepared in the preparation step (S01) described above, or may be composed of the copper nanoparticle aqueous dispersion liquid after storage in the storage step (S02).

Because the copper nano-ink has a rate of change of the copper ion concentration within the range described above, the copper ion concentration can be kept low within the range described above even in a case of being stored for a relatively long period of time. Thus, the copper nano-ink has a high dispersibility of copper nanoparticles at the time of use. [0049] The upper limit of the rate R of change of the copper ion concentration is preferably $4.0 \times 10^{-2} \times T$, is more preferably $3.0 \times 10^{-2} \times T$, and is further more preferably $2.0 \times 10^{-2} \times T$. When the rate R of change of the copper ion concentration exceeds the upper limit, the storage time of the copper nano-ink cannot be sufficiently prolonged, and the time of use may be limited.

The average particle size and the coefficient of variation of the particle size distribution of the copper nanoparticles of the copper nano-ink can be similar to the average particle size and the coefficient of variation of the particle size distribution of the copper nanoparticles of the copper nanoparticle aqueous dispersion liquid. Also, the copper ion concentration and the anion concentration of the copper nano-ink can be similar to the copper ion concentration and the anion concentration of the copper nanoparticle aqueous dispersion liquid. Furthermore, the value of C'×D' where the anion concentration of the copper nano-ink is C' [g/L] and the average particle size of the copper nanoparticles is D' [nm] can be similar to the value of C×D in S13.

Other Embodiments

The embodiments disclosed above should be considered exemplary in all respects and not limiting. The scope of the present invention is not limited to configurations of the above described embodiments, but is indicated by claims and is intended to include all changes within the meaning and scope of equivalence with the claims.

For example, in the method of manufacturing a copper nano-ink, it is preferable that anions be added to the copper nanoparticle dispersion liquid in the copper nanoparticle precipitation step (S11), but anions may be added in another step such as the copper nanoparticle aqueous dispersion liquid preparation step (S13), for example.

The washing procedure in the copper nanoparticle washing step (S12) is not limited to the procedure in the above described embodiment. In S12, the copper nanoparticles may be washed, for example, by a filtration treatment, an electrodialysis treatment, or the like.

EXAMPLES

Although the present disclosure will be described in detail with reference to Examples, the present disclosure is not limited to Examples.

[No. 1]

(Preparation Step)

<Copper Nanoparticle Precipitation Step>

In a reaction tank, 800 g (0.1 M) of a titanium trichloride solution as a reducing agent, 500 g of sodium carbonate as a pH adjuster, 900 g of sodium citrate as a complexing agent, and 10 g of polyvinylpyrrolidone (molecular weight of 30000) as a dispersant were dissolved in 10 L of pure water, and the aqueous solution was kept at 35° C. To the aqueous solution, 100 g (0.04 M) of an aqueous solution of copper nitrate trihydrate kept at the same temperature was added while stirring in 2 seconds to precipitate 25 g of copper particles, and a copper nanoparticle dispersion liquid containing copper nanoparticles and chloride ions derived from titanium trichloride was prepared.

<Copper Nanoparticle Washing Step>

The copper nanoparticles precipitated in the copper nanoparticle precipitation step were centrifuged with a centrifugal separator at a centrifugal acceleration of 70000 G into a copper nanoparticle concentrate containing the copper nanoparticles and a liquid phase. 1 L of pure water was added to the copper nanoparticle concentrate to re-disperse the copper nanoparticles by ultrasonic waves, and centrifugation was performed again at a centrifugal acceleration of 70000 G to separate into the copper nanoparticle concentrate and the liquid phase. Then, 1 L of pure water was added to the copper nanoparticle concentrate to re-disperse the copper nanoparticles with ultrasonic waves, and centrifugation was performed again at a centrifugal acceleration of 70000 G to separate into the copper nanoparticle concentrate and the liquid phase to adjust the copper ion concentration and the anion concentration.

<Copper Nanoparticle Aqueous Dispersion Liquid Preparation Step>

A copper nanoparticle aqueous dispersion liquid in which the concentration of the copper nanoparticles was 30% by mass was prepared by adding pure water to the copper nanoparticles washed in the copper nanoparticle washing step described above. Table 1 indicates the copper ion concentration and anion concentration (chloride ion concentration) of the copper nanoparticle aqueous dispersion liquid. In addition, using "NanoTrac Wave" manufactured by MicrotracBEL, the average particle size (D50) of copper nanoparticles contained in the copper nanoparticle aqueous dispersion liquid was measured. Table 1 indicates the measured results. Further, Table 1 indicates the values of C×D where the anion concentration is C [g/L] and the average particle size of copper nanoparticles is D [nm].

(Storage Step)

Then, immediately after the copper nanoparticle aqueous dispersion liquid preparation step, the copper nanoparticle aqueous dispersion liquid prepared in the copper nanoparticle aqueous dispersion liquid preparation step was stored in a refrigerator with the internal temperature kept at 5° C. Table 2 indicates the copper ion concentration and the anion concentration of the copper nanoparticle aqueous dispersion liquid on the 30th day, the 50th day, and the 100th day. Also, Table 2 indicates the rate [%/h] of change of the copper ion concentration on the 30th day, the 50th day, and the 100th day.

[No. 2 and No. 3]

A copper nano-ink was manufactured similarly to No. 1 except that the copper ion concentration, the anion concentration (the chloride ion concentration), and the average particle size of the copper nanoparticles in the copper nanoparticle aqueous dispersion liquid prepared in the copper nanoparticle aqueous dispersion liquid preparation step were as indicated in Table 1.

[No. 4 to No. 6]

A copper nano-ink was manufactured similarly to No. 1 except that the copper ion concentration, the anion concentration (the chloride ion concentration), and the average particle size of the copper nanoparticles in the copper nanoparticle aqueous dispersion liquid prepared in the copper nanoparticle aqueous dispersion liquid preparation step were as indicated in Table 1 and the storage temperature of the copper nanoparticle aqueous dispersion liquid in the storage step was 25° C.

[No. 7 to No. 9]

A copper nano-ink was manufactured similarly to No. 1 except that the copper ion concentration, the anion concentration (the chloride ion concentration), and the average particle size of the copper nanoparticles in the copper nanoparticle aqueous dispersion liquid prepared in the copper nanoparticle aqueous dispersion liquid preparation step were as indicated in Table 1 and the storage temperature of the copper nanoparticle aqueous dispersion liquid in the storage step was 2° C.

TABLE 1

| | COPPER ION CONCENTRATION [g/L] | ANION CONCENTRATION [g/L] | AVERAGE PARTICLE SIZE OF COPPER NANOPARTICLES [nm] | C × D |
|---|---|---|---|---|
| No. 1 | 0.15 | 1.00 | 100 | 100.0 |
| No. 2 | 0.26 | 3.00 | 25 | 75.0 |
| No. 3 | 0.40 | 6.50 | 15 | 97.5 |
| No. 4 | 0.15 | 1.00 | 100 | 100.0 |
| No. 5 | 0.26 | 3.00 | 25 | 75.0 |
| No. 6 | 0.40 | 6.50 | 15 | 97.5 |
| No. 7 | 0.15 | 1.00 | 100 | 100.0 |
| No. 8 | 0.26 | 3.00 | 25 | 75.0 |
| No. 9 | 0.40 | 6.50 | 15 | 97.5 |

TABLE 2

| | STORAGE DAYS [DAYS] | COPPER ION CONCENTRATION [g/L] | ANION CONCENTRATION [g/L] | RATE OF CHANGE OF COPPER ION CONCENTRATION [%/h] |
|---|---|---|---|---|
| No. 1 | 30 | 0.22 | 1.00 | 0.20 |
| | 50 | 0.25 | 1.00 | 0.14 |
| | 100 | 0.28 | 1.00 | 0.08 |
| No. 2 | 30 | 0.35 | 3.00 | 0.19 |
| | 50 | 0.40 | 3.00 | 0.13 |
| | 100 | 0.44 | 3.00 | 0.07 |
| No. 3 | 30 | 0.53 | 6.50 | 0.18 |
| | 50 | 0.58 | 6.50 | 0.12 |
| | 100 | 0.64 | 6.50 | 0.07 |
| No. 4 | 30 | 0.35 | 1.00 | 0.32 |
| | 50 | 0.43 | 1.00 | 0.24 |
| | 100 | 0.52 | 1.00 | 0.14 |
| No. 5 | 30 | 0.86 | 3.00 | 0.46 |
| | 50 | 1.07 | 3.00 | 0.34 |
| | 100 | 1.28 | 3.00 | 0.21 |
| No. 6 | 30 | 1.74 | 6.50 | 0.60 |
| | 50 | 2.16 | 6.50 | 0.45 |
| | 100 | 2.58 | 6.50 | 0.27 |
| No. 7 | 30 | 0.18 | 1.00 | 0.17 |
| | 50 | 0.20 | 1.00 | 0.11 |
| | 100 | 0.22 | 1.00 | 0.06 |
| No. 8 | 30 | 0.28 | 3.00 | 0.15 |
| | 50 | 0.30 | 3.00 | 0.10 |
| | 100 | 0.32 | 3.00 | 0.05 |
| No. 9 | 30 | 0.41 | 6.50 | 0.14 |
| | 50 | 0.42 | 6.50 | 0.09 |
| | 100 | 0.43 | 6.50 | 0.04 |

[Evaluation Results]

As indicated in Tables 1 and 2, for each of No. 1 to No. 3 and No. 7 to No. 9 in which the copper ion concentration and the anion concentration (chloride ion concentration) of the copper nanoparticle aqueous dispersion liquid were appropriately adjusted in the copper nanoparticle aqueous dispersion liquid preparation step, and the copper nanoparticle aqueous dispersion liquid was stored at 5° C. or less in the storage step, the copper ion concentration was kept 1.0 g/L or less even when the storage period was longer, and the dispersibility of copper nanoparticles in the obtained copper nano-ink was excellent.

In particular, for each of No. 7 to No. 9 where the storage temperature in the storage step is 2° C., the copper ion concentration of the copper nanoparticle aqueous dispersion liquid can be kept lower than that of No. 1 to No. 3 where the storage temperature in the storage step is 5° C.

Also, as indicated in Table 2, in a case in which the copper ion concentration is greater than or equal to 0.1 g/L and less than or equal to 1.0 g/L, and the anion concentration is greater than or equal to 0.5 g/L and less than or equal to 8.0 g/L, the rate of change in the copper ion concentration can be kept low, and the dispersibility of the copper nanoparticles can be kept sufficiently high even when being stored for a relatively long period of time.

The invention claimed is:

1. A copper nano-ink in which copper nanoparticles and anions are dispersed in water,
    wherein a copper ion concentration is greater than or equal to 0.1 g/L and less than or equal to 1.0 g/L and an anion concentration is greater than or equal to 0.5 g/L and less than or equal to 8.0 g/L, and
    wherein $1.0 \times 10^{-2} \times T \leq R \leq 9.0 \times 10^{-2} \times T$ where a rate of change of the copper ion concentration is R [%/h] and a storage temperature of the copper nano-ink is T [° C.].

* * * * *